United States Patent
Chang et al.

(10) Patent No.: US 7,297,040 B2
(45) Date of Patent: Nov. 20, 2007

(54) METHOD FOR MANUFACTURING A FLEXIBLE PANEL FOR A FLAT PANEL DISPLAY

(75) Inventors: Jung-Fang Chang, Yongkang (TW); Chich-Shang Chang, Bade (TW); Chi-Lin Chen, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 11/517,357

(22) Filed: Sep. 8, 2006

(65) Prior Publication Data

US 2007/0004308 A1   Jan. 4, 2007

Related U.S. Application Data

(63) Continuation of application No. 10/695,810, filed on Oct. 30, 2003, now Pat. No. 7,147,531.

(51) Int. Cl.
*H01J 9/26* (2006.01)

(52) U.S. Cl. .............................. 445/25; 445/23; 445/24; 313/495; 313/498; 313/512; 156/153; 156/154; 156/155

(58) Field of Classification Search ............ 445/23–24, 445/25; 313/495–498, 511–512; 156/153–155, 156/247

See application file for complete search history.

(56) References Cited

U.S. PATENT DOCUMENTS

| 6,429,053 | B1 | 8/2002 | Yamazaki et al. | 438/149 |
|---|---|---|---|---|
| 6,814,832 | B2 | 11/2004 | Utsunomiya | 156/230 |
| 6,861,802 | B2 | 3/2005 | Hishida | 313/512 |
| 2002/0139981 | A1 | 10/2002 | Young | 257/72 |
| 2004/0097161 | A1 | 5/2004 | Gourlay | 445/24 |
| 2004/0214380 | A1 | 10/2004 | Leib et al. | 438/151 |

*Primary Examiner*—Joseph Williams
*Assistant Examiner*—Hana Asmat Sanei
(74) *Attorney, Agent, or Firm*—Bacon & Thomas, PLLC

(57) ABSTRACT

A method for manufacturing a flexible panel is disclosed, which has the following steps. First, a first substrate having a plurality of functional switches or conducting lines thereon is provided. Then, a second substrate is bonded on the functional switches or conducting lines, and the first substrate is thinned to a predetermined thickness subsequently. Afterwards, a flexible third substrate is adhered on the first substrate, wherein the first substrate is sandwiched between the second substrate and the third substrate. Finally, the second substrate is removed.

7 Claims, 3 Drawing Sheets

METHOD FOR MANUFACTURING A FLEXIBLE PANEL FOR A FLAT PANEL DISPLAY

This application is a continuation of nonprovisional application Ser. No. 10/695,810, filed Oct. 30, 2003 now U.S. Pat. No. 7,147,531.

BACKGROUND OF THE INVENTION

1. Field of the Invention

The present invention relates to a method for manufacturing a flexible panel and, more particularly, to a method for manufacturing a flexible panel for a flat panel display.

2. Description of Related Art

As one trend in flat panel display technologies is increasing the display areas, a parallel trend is the developments in technical innovations of minimizing weight and thickness. A key one of those developments is to replace the glass substrate with a plastic substrate. However, the device characteristics and film quality made on the plastic substrate are inferior to those made on the glass substrate because the plastic substrate can not resist to the high-processing temperature, around 300 to 400 degrees C. Although Sharp Co. has developed a plastic substrate that is capable of withstanding up to approx. 220 degrees C., there is still a need to re-design or modify the conventional FPD process due to the plasticity and flexibility of the plastic substrate.

Seiko Epson Co. has proposed a transfer method, which forms an amorphous silicon layer containing hydrogen (a-Si:H) on a glass substrate, and then forms thin film devices on the surface of the a-Si:H layer, wherein the a-Si:H layer is sandwiched between the thin film devices and the glass substrate. Afterwards, the a-Si:H layer is irradiated with laser light so as to form internal and/or interfacial exfoliation of the a-Si:H layer. Finally, the glass substrate is detached from the a-Si:H layer. However, the energy of the laser light must be controlled precisely so that damage to the thin film devices otherwise caused by the exfoliation is prevented. Besides, such technique is quite difficult and low yield rate.

Whether forming the thin film devices directly on the plastic substrate or using the transfer method, it is necessary to take account of the characteristics of the plastic substrate. Take the thin film transistor for example, a passivation layer, such as a hard coat or a water/air barrier is generally needed to be coated on the surface of a plastic substrate. As for organic thin film transistors (OTFT), the plastic substrate especially needs severe treatments because the organic materials are extremely sensitive to moisture.

Although the plastic substrate is lightweight, thin, and flexible, it has too low a Tg (glass transition temperature) point to withstand high temperature processing, that influences the characteristics of the devices. In addition to that, the problems during the fabrication of thin film devices on the plastic substrate, such as the stress, the static electricity, and the thermal expansion are not easy to be overcome.

Therefore, it is desirable to provide an improved method for manufacturing a flexible panel to mitigate and/or obviate the aforementioned problems.

SUMMARY OF THE INVENTION

The object of the present invention is to provide a method for manufacturing a flexible panel so that the thin film devices formed on a glass substrate are transferred onto a plastic substrate through the thinning and adhering steps, and the lightweight, thin, and flexible panel is easily obtained.

Another object of the present invention is to provide a method for manufacturing a flexible panel so that the mass production of the panels of large size can be carried out by the conventional process without varying the equipment and the processing parameters.

To achieve the object, the method for manufacturing a flexible panel of the present invention includes the following steps. First, a first substrate having a plurality of functional switches or conducting lines thereon is provided. Then, a second substrate is bonded on the functional switches or conducting lines, and the first substrate is thinned to a predetermined thickness subsequently. Afterwards, a flexible third substrate is adhered on the first substrate, wherein the first substrate is sandwiched between the second substrate and the third substrate. Finally, the second substrate is removed.

The aforesaid method further comprises a step of forming a plurality of light valves, light-emitters, or conducting layers on the functional switches or conducting lines, and adhering or sealing a flexible fourth substrate on the light valves, light-emitters, or conducting layers after removing the second substrate such that the light valves, light-emitters, or conducting layers are located between the third substrate and the fourth substrate.

In another aspect, the method for manufacturing a flexible panel of the present invention includes the following steps. First, a first substrate having a plurality of functional switches or conducting lines thereon is provided. Then, a plurality of light valves, light-emitters, or conducting layers are formed on the functional switches or conducting lines. Afterwards, a flexible third substrate is adhered on the light valves, light-emitters, or conducting layers, and the first substrate is thinned to a predetermined thickness. Finally, a flexible fourth substrate is bonded on the thinned first substrate, wherein the first substrate, the light valves, light-emitters, or conducting layers, and the functional switches or conducting lines are located between the third substrate and the fourth substrate.

In still another aspect, the method for manufacturing a flexible panel of the present invention includes the following steps. First, a first substrate having a plurality of functional switches or conducting lines thereon is provided, and then a second substrate is bonded on the functional switches or conducting lines. Next, the first substrate is thinned to a predetermined thickness, and a fifth substrate is adhered on the first substrate. Afterwards, the second substrate is removed, and a plurality of light valves, light-emitters, or conducting layers are formed on the functional switches or conducting lines. Finally, the fifth substrate on the first substrate is removed, and a flexible polymer is coated on the surface of the light valves, light-emitters, or conducting layers and the first substrate.

The method of the present invention is applicable to the currently existing processes of display panels without tuning any processing parameters. What the present invention further involves is to thin the first substrate and adhering or sealing the flexible substrate. Incidentally, it is optional to make sure in advance that the produced panels are workable. Moreover, the excellent adhesion between the thin film devices and the thinned glass substrate greatly improves the problems in the prior art of bad adhesion caused by the stress and poor film quality occurring with the plastic substrates undergoing the low temperature process. Owing to the superior moisture resistance of the glass substrate, the present invention is particularly competitive in application to the organic thin film transistors. The remaining glass substrate further contributes to greater selectivity of glues and plastic substrates.

The method for manufacturing a flexible panel of the present invention is optionally to coat the surface of the flexible substrate with a flexible polymer, which makes the final product particularly thin, and economizes the use of glues. It is allowable to carry out the method of the present invention after the components of display panel, such as the liquid crystal layer or the organic electroluminescent layer, the alignment film, the frame glue, and the upper substrate are packaged completely, and then the filters are pasted.

Other objects, advantages, and novel features of the invention will become more apparent from the following detailed description when taken in conjunction with the accompanying drawings.

DETAILED DESCRIPTION OF THE PREFERRED EMBODIMENT

EXAMPLE 1

Figure 1:
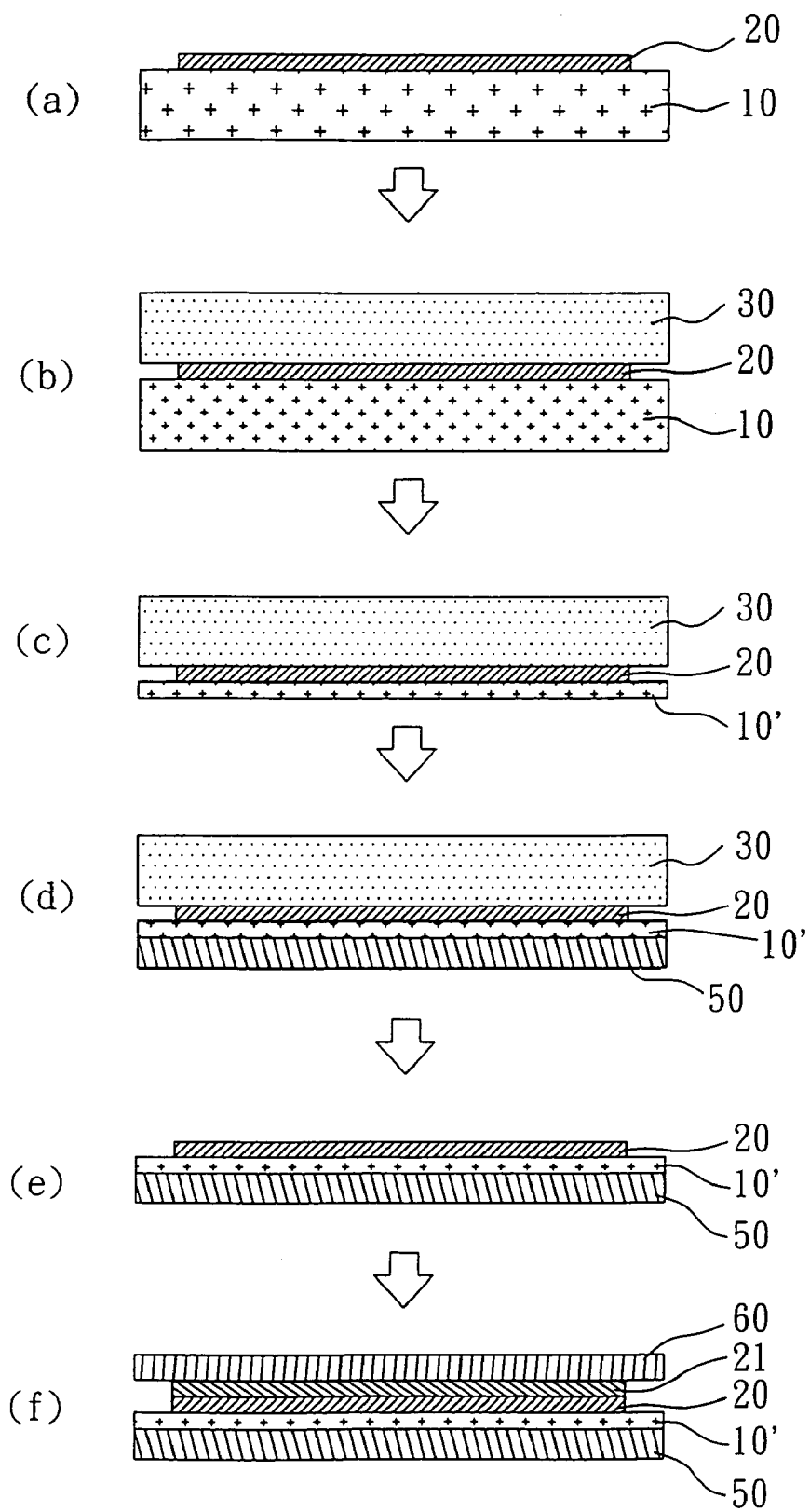
FIG. 1 is a flow diagram of the first example of the present invention.

With reference to FIG. 1, there is shown the flow diagram of the first example of the present invention. The method for manufacturing a flexible panel of the present invention includes the following steps. First, a first substrate 10 is provided having a plurality of functional switches or conducting lines 20 formed thereon. The functional switches may be thin film transistors. Next, the second substrate 30 is bonded on the functional switches or conducting lines 20. Afterwards, the first substrate 10 is thinned to a predetermined thickness. The flexible third substrate 50 is subsequently adhered on the thinned first substrate 10' so that the thinned first substrate 10' is sandwiched between the second substrate 30 and the flexible third substrate 50. Finally, the second substrate 30 is removed.

It is optional to form a plurality of light valves, light-emitters, or conducting layers 21 on the functional switches or conducting lines 20 and then the flexible fourth substrate 60 is adhered on the light valves, light-emitters, or conducting layers 21 after the second substrate 30 is removed so that the light valves, light-emitters, or conducting layers 21 are located between the third substrate 50 and the fourth substrate 60. The light valve is a liquid crystal display device, and the light-emitter is an organic electroluminescent display device.

EXAMPLE 2

Figure 2:
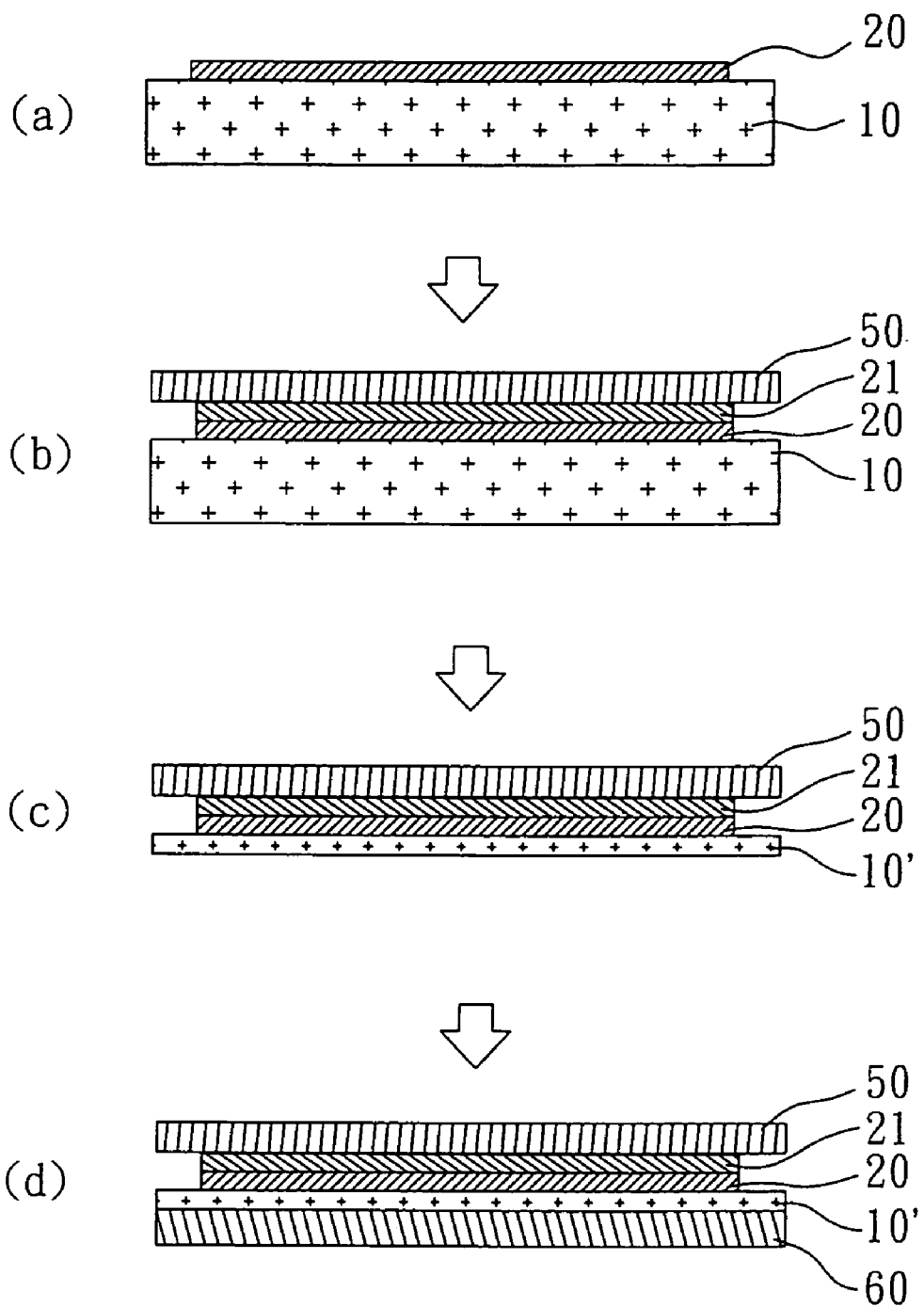
FIG. 2 is a flow diagram of the second example of the present invention.

With reference to FIG. 2, there is shown the flow diagram of the second example of the present invention. The method for manufacturing a flexible panel of the present example will be illustrated as follows. The first substrate 10 having a plurality of functional switches or conducting lines 20 formed thereon is provided first. Afterwards, a plurality of light valves, light-emitters, or conducting layers 21 is formed on the functional switches or conducting lines 20, and the flexible third substrate 50 is adhered on the light valves, light-emitters, or conducting layers 21. As a result, the functional switches or conducting lines 20 and the light valves, light-emitters, or conducting layers 21 are sandwiched between the first substrate 10 and the third substrate 50. The first substrate 10 is then thinned to a predetermined thickness and forms the thinned first substrate 10'. Finally, the flexible fourth substrate 60 is adhered on the thinned first substrate 10' so that the functional switches or conducting lines 20 and the light valves, light-emitters, or conducting layers 21 are located between the third substrate 50 and the fourth substrate 60.

EXAMPLE 3

Figure 3:
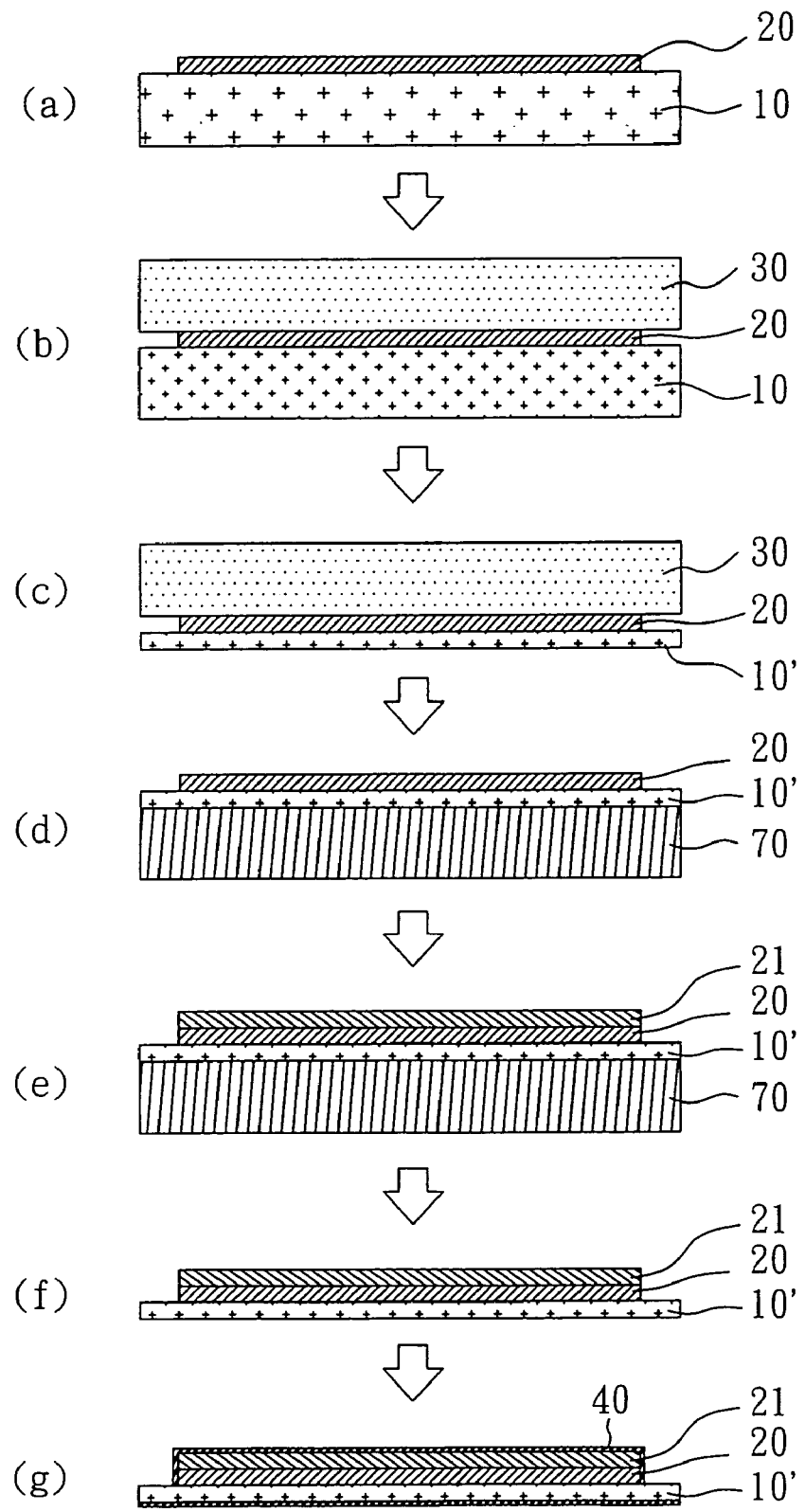
FIG. 3 is a flow diagram of the third example of the present invention.

With reference to FIG. 3, there is shown the flow diagram of the third example of the present invention. The method for manufacturing a flexible panel of the present example will be illustrated as follows. The first substrate 10 having a plurality of functional switches or conducting lines 20 formed thereon is provided first. The functional switches are thin film transistors in the present example. Next, the second substrate 30 is bonded on the functional switches or conducting lines 20, and then the first substrate 10 is thinned to a predetermined thickness to form the thinned first substrate 10'. Afterwards, the fifth substrate 70 is adhered on the thinned first substrate 10' and subsequently the second substrate 30 is removed. Next, a plurality of light valves, light-emitters, or conducting layers 21 is formed on the functional switches or conducting lines 20, and then the fifth substrate 70 is removed. Finally, the surface of the whole substrate is coated with a flexible polymer layer 40.

In the foresaid three examples, the functional switches can be any well-known switches for electricity. Preferably, the functional switch is a thin film transistor or a diode. The second substrate as described above works for supporting the first substrate during the thinning step and preventing the first substrate from breaking. The thinning method is optionally selected from polishing, cutting, and etching. Preferably, the first substrate is thinned to have a thickness ranging from 30 to 100 μm.

The third and fourth substrates aforementioned are made of flexible materials that are generally used, or polymers. Among them, the plastics have the most potential. The plastics are limited in conventional applications as they cannot endure the high temperature. Nevertheless, this problem has been overcome by the present invention. The present invention forms the thin film devices on the glass substrate, which is then thinned and bonded with the plastic substrate. While the plastic substrate does not have to proceed with a high temperature process, the flexible panel is easily obtained. Furthermore, the plastic substrate is adhered on the glass substrate that has been thinned, so there is a wide choice of joint glue and plastic substrate, which means that the generally used joint glues or plastic substrates are applicable to the present invention.

Example 3 of the present invention shows an even easier method for manufacturing a flexible panel. After the thin film devices are formed and the first substrate is thinned, the surface of the whole product is coated with a polymer having a thickness from 1 to 10 μm by immersion, spin-coating, or other well-known techniques. Consequently, the panel obtained is lighter than the prior panels. Also, in this example the joint glue is not needed.

Although the present invention has been explained in relation to its preferred embodiment, it is to be understood that many other possible modifications and variations can be made without departing from the spirit and scope of the invention as hereinafter claimed.

What is claimed is:

1. A method for manufacturing a flexible panel comprising:
   (a) providing a first substrate having a plurality of functional switches or conducting lines thereon;
   (b) bonding a second substrate on said plurality of functional switches or conducting lines;
   (c) thinning said first substrate to a predetermined thickness;
   (d) adhering or sealing a flexible third substrate on said first substrate, wherein said first substrate is sandwiched between said second substrate and said third substrate; and
   (e) removing said second substrate.

2. The method as claimed in claim 1, further comprising a step (f) of forming a plurality of light valves, light-emitters, or conducting layers on said plurality of switches or conducting lines, and adhering or sealing a flexible fourth substrate on said plurality of light valves, light-emitters, or conducting layers after said step (e), wherein said plurality of light valves, light-emitters, or conducting layers are located between said third substrate and said fourth substrate.

3. The method as claimed in claim 1, wherein said first substrate is a glass substrate.

4. The method as claimed in claim 1, wherein said thinning method in step (c) is polishing, cutting, or etching.

5. The method as claimed in claim 1, wherein said switch is a thin film transistor.

6. The method as claimed in claim 1, wherein said first substrate is thinned to have a thickness ranging from 30 to 100 μm.

7. The method as claimed in claim 1, wherein said flexible third substrate is made of plastic.

* * * * *